Patented Apr. 6, 1954

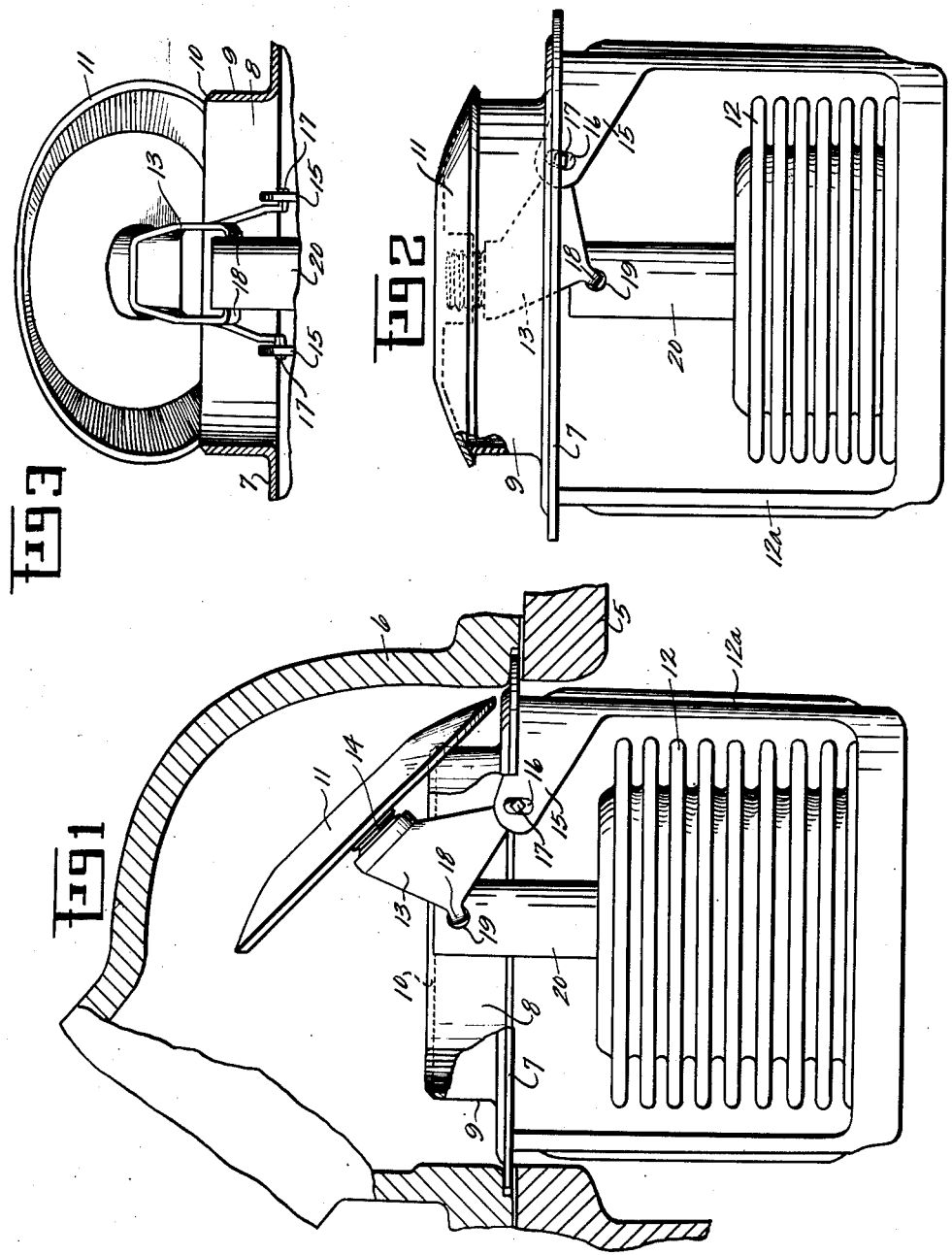

2,674,412

UNITED STATES PATENT OFFICE 2,674,412

THERMOSTATIC VALVE

Paul F. Early and William R. Winslow, Dayton, Ohio, assignors to The Standard-Thomson Corporation, Dayton, Ohio, a corporation of Ohio Application September 14, 1951, Serial No. 246,649

1 Claim. (Cl. 236—34)

This invention relates to valves and more particularly to thermostatically operated valves to control the circulation of the liquid in an automobile engine cooling system, such a device as a whole being commonly called a thermostat.

The coolant flow requirements of an automobile engine cooling system are often very critical. It is important that the valve shall be of such a character that leakage through the same, when in a closed position, will be reduced to a minimum in order to facilitate the rapid warming-up of the engine, and that the same valve shall allow as high a flow as possible at high temperatures to obtain maximum cooling efficiency for a given size of cooling system. It is also sometimes desirable to obtain minimum and maximum flows within a small variation of temperature.

In thermostatically controlled cooling systems as heretofore used the valve has, for the most part at least, been either of the poppet type or of the butterfly type. Each type of valve has characteristics which are highly desirable for the purpose but neither type includes all the desirable characteristics of the other type, and it is an object of the present invention to provide a valve having the desirable characteristics of both the poppet valve and the butterfly valve.

More specifically, it is an object of the invention to provide a valve which operates truly as a poppet valve in seating and in opening small distances above the seat, and as a hinged valve in operating in the more fully opened positions.

A further object of the invention is to provide such a valve having highly efficient sealing qualities.

A further object of the invention is to provide such a valve in which the movable valve member is of a character to receive and utilize additional force of the water impinging thereon during the initial opening movement thereof.

A further object of the invention is to provide such a valve which will permit an increased flow of liquid through the same in proportion to the diameter of the passage in which it is mounted.

A further object of the invention is to provide such a valve in which the movable valve member is moved to an inclined position with relation to the valve seat to permit a greater flow of liquid.

A further object of the invention is to provide such a valve in which balance and stability with respect to the pressure ahead of the valve will be maintained when the temperature responsive element is in the nature of a bellows.

A further object of the invention is to provide such a valve in which the mechanical connection between the temperature responsive element and the movable valve member is such as to increase the movement of the movable valve member with relation to the movement of the temperature responsive element.

A further object of the invention is to provide such a valve which can be adjusted to cause the opening movement thereof to begin at different temperatures.

A further object of the invention is to provide such a valve which will tend to open under fluid pressure in the event of the failure of the temperature responsive element or of the connection between that element and the movable valve member and thus protect the engine against overheating.

Other objects of the invention may appear as the apparatus is described in detail.

In the accompanying drawings Fig. 1 is a view partly in section showing the thermostat mounted in the outlet casting of the cooling jacket of an automobile engine and with the movable valve member in its open position; Fig. 2 is a side elevation of the valve and its operating device with the movable valve member in its closed position; and Fig. 3 is a sectional view through the valve mechanism showing the connections between the temperature responsive element and the movable valve member in front elevation, with the movable valve member in its open position.

In these drawings we have illustrated one embodiment of our invention and have shown the same as a thermostat having single flow passage, but it is to be understood that the invention may take various forms and may be used with a thermostat having a by-pass without departing from the spirit of the invention.

In the present embodiment of the invention the thermostat is shown as mounted in a liquid passage extending through a part 5 of the cooling jacket of an automobile engine and a part 6 of an outlet casting leading from the cooling jacket to the radiator. The valve comprises a transverse member 7 extending across the passage and secured to the walls of the passage, as by clamping the edge portion thereof between the cooling jacket and the outlet casting. This transverse member has a central opening, or port, 8 leading from the radiator to the outlet casting and this opening is surrounded by an annular member 9 rigidly secured to the member 7 and extending a substantial distance in the direction of flow through the passage, in the present instance upwardly, into the outlet casting, the upper edge 10 of this annular member constituting a valve seat. Co-operating with this valve seat is a movable valve member 11 which is preferably circular in form and of a diameter slightly greater than the diameter of the valve seat to provide the same with an inner surface extending radially beyond the valve seat. This movable valve member is mounted for movement to a substantially horizontal position in engagement with the valve seat and for movement to an inclined position, as shown in Fig. 1, in which the lower portion of the movable member extends laterally beyond the adjacent portion of the valve seat and below the level of the valve seat.

The movable valve member is moved to and from its closed position by a temperature responsive device supported in the cooling jacket and here shown as an extensible bellows 12, the lower end of which is secured to the transverse portion of a U-shaped structure 12a, the arms of which are rigidly connected at their upper ends with the transverse member 7. A supporting member, such as a lever 13, is rigidly secured to the movable valve member 11, preferably at the center of the latter. Preferably the connection between the supporting member and the movable valve member is adjustable and as here shown the supporting member has a part 14 which is screw threaded into the valve member. In the form illustrated the supporting member comprises two arms extending from the opposite sides of the threaded portion thereof and connected with the structure 12a for movement about a transverse axis with relation to that structure. The structure 12a is provided just below the transverse member 7 with inwardly extending arms 15 spaced laterally one from the other and provided with openings 16 to receive projections, or pintles, 17 on the lower portions of the two parts of the supporting member 13. Preferably the openings 16 are in the nature of relatively narrow elongate slots of a width approximating the maximum diameter of the respective pintles 17.

The supporting member 13 is connected between its ends with the temperature responsive device 12, as by providing the member 13 with fingers, or projections 18 which extend into the respective ends of a transverse opening 19 in a stem 20 which is rigidly secured to and extends upwardly from the movable end wall of the bellows 12. Thus when the temperature of the liquid in which the temperature responsive device is immersed is low, the bellows will be collapsed and the movable valve member will be in valve closing engagement with the valve seat and will be held firmly in engagement therewith to tightly seal the valve. An increase in the temperature of the liquid surrounding the bellows will expand the latter and a predetermined expansion thereof will move the pintles of the supporting member 13 upwardly in the slots 16 and thus move the movable member in the direction of the flow of liquid through the passage to a slightly open position and initiate the flow of liquid through the valve. The continued expansion of the bellows will move the supporting member about the axis of the pintles 17 and thus move the movable valve member 11 to an inclined position in which the lower edge thereof is below the valve seat and between the annular member 9 and the wall of the outlet casting, and the upper portion of the valve member is spaced above the valve seat substantially in line with the center thereof.

A decrease in the temperature of the liquid will contract the temperature responsive element and move the movable valve member toward valve closing position and when the temperature falls to a predetermined degree the movable valve member will be moved into full contact with the valve seat and will tightly seal the valve and prevent any material leakage through the same. During the latter part of this closing movement the movable member will assume a position parallel with the valve seat and will then move in a vertical line into closing engagement with the valve seat.

The movable valve member, being of a diameter somewhat greater than the diameter of the valve seat, extends outwardly beyond the valve seat, thus providing the valve member with an inner surface having a relatively large area against which the liquid under pressure impinges when the movable member is spaced a short distance from its closed position. The additional force thus exerted on the movable member prevents the valve from clinging near the seat when there is a drop in pressure due to the velocity of the constricted flow between the movable member and the valve seat. It does this by imparting to the movable member a positive tendency both to open when the valve begins to open and to close tightly when the movable member is close enough to the valve seat to materially reduce the force of the impinging flow of the liquid on the extended area thereof. In the usual installation of a poppet valve thermostat in the cooling jacket outlet the movable valve member can be extended outwardly beyond the valve seat only a very slight distance, if at all, because this extension would materially restrict the flow of liquid between the outer edge of the movable member and the outlet casting. In applicants' valve the movable member moves to a tilted or inclined position which minimizes, or eliminates, this restriction of the flow of the liquid and as a result the quantity of flow is increased. Further applicants' construction is such that a larger valve, having a larger port and a movable member having a relatively large extended area can be installed in an outlet casting of standard diameter without causing a material restriction of flow between the valve member and the casting, thus making possible a greater quantity of flow.

The movement of the movable member to an inclined or tilted position with relation to the valve seat also materially increases the possible quantity of flow through the port, because when this movable member is in its fully open position a substantial part of the valve member is entirely out of the flow path of the liquid through the port and the remaining portion of the movable member is so positioned that it offers little obstruction to the flow of the liquid.

In thermostats of this general type the liquid between the bellows and the valve exerts a downward force on the bellows as well as an upward force on the valve. The effective area of the bellows and the area of the valve are proportioned to provide a desired balance or tendency to open or close with respect to the pressure. In a poppet type of valve the measure of this balance remains substantially constant throughout the opening range of the movable valve member. In the butterfly type of valve the area on each side of the pivotal axis of the movable member can be proportioned to give the valve a tendency to open against the pressure on the bellows but this tendency decreases in effectiveness as the valve opens. In applicants' valve this balance is substantially the same as that of the poppet valve when the valve member is near its closed position. In the open positions of the valve member that area thereof on the side of the pivotal axis on which pressure is effective in closing the valve moves laterally away from the port to a position in which it is not exposed to pump or impact pressure. This increases the opening tendency of the valve as it opens. The area on which pressure is effective in opening the valve moves to the center of the high velocity stream passing through the port. The areas on which the pressure changes occur are those which are furthest away from the axis about which the movable member moves and for this reason very strong opening tendencies can be obtained with a minimum of resistance to flow.

The movement of the movable valve member is materially increased over the movement of the temperature responsive element. This is due to the lever connections between the temperature responsive element and the movable valve member, which multiply the movement of the valve member with relation to the movement of the temperature responsive element. Further, in applicants' valve the connections between the temperature responsive element and the movable valve member can be adjusted to vary the temperature at which the opening movement of the valve member will begin. In the present instance this is accomplished by means of the screw threaded connection between the valve member and its supporting member.

The movable valve member being opposed to the flow of liquid will open in the event of the failure of the temperature responsive element or of the connections between the same and the movable valve member, thus preventing the overheating of the engine.

While we have shown and described one embodiment of our invention we wish it to be understood that we do not desire to be limited to the details thereof as various modifications may occur to a person skilled in the art.

Having now fully described our invention what we claim as new and desire to secure by Letters Patent, is:

A valve for controlling the flow of fluid through a passage, comprising a structure adapted to be mounted in said passage including a stationary valve seat member having a port therethrough, a movable cup-like valve member having its concave surface facing the valve seat member and having an outer diameter greater than the diameter of the valve seat member, a bifurcated member provided with an elongated orifice therein and attached to said valve seat member and extending into said passage, a pin extending through said elongate orifice, an arm attached to the pin, a temperature responsive device mounted on said structure and attached to the arm, and a threaded member adjustably joining said arm and said movable cup-like valve member.

References Cited in the file of this patent

UNITED STATES PATENTS

| Number | Name | Date |
|--------|------|------|
| 1,001,130 | Faller | Aug. 22, 1911 |
| 2,052,313 | Payne | Aug. 25, 1936 |
| 2,142,442 | Giesler | Jan. 3, 1939 |
| 2,255,159 | Giesler | Sept. 9, 1941 |
| 2,439,582 | Scheineman | Apr. 13, 1948 |
| 2,576,877 | Golob | Nov. 27, 1951 |

FOREIGN PATENTS

| Number | Country | Date |
|--------|---------|------|
| 629,238 | France | July 19, 1927 |